United States Patent
Harper et al.

(10) Patent No.: US 7,359,326 B1
(45) Date of Patent: Apr. 15, 2008

(54) METHOD FOR SPLITTING DATA AND ACKNOWLEDGEMENTS IN A TCP SESSION

(75) Inventors: Matthew Harper, Tewksbury, MA (US); Richard J. Dynarski, Freehold, NJ (US); Timothy G. Mortsolf, Ludlow, MA (US)

(73) Assignee: 3Com Corporation, Marlborough, MA (US)

(*) Notice: Subject to any disclaimer, the term of this patent is extended or adjusted under 35 U.S.C. 154(b) by 857 days.

(21) Appl. No.: 10/358,872

(22) Filed: Feb. 5, 2003

Related U.S. Application Data

(60) Provisional application No. 60/354,662, filed on Feb. 5, 2002.

(51) Int. Cl.
*H04L 1/00* (2006.01)

(52) U.S. Cl. ........... 370/235; 370/395.42; 370/444; 370/474; 370/522

(58) Field of Classification Search ........... 370/229, 370/235, 401, 402, 444, 474, 230.1, 395.21, 370/395.42, 395.52, 392, 522, 295.52
See application file for complete search history.

(56) References Cited

U.S. PATENT DOCUMENTS

| 6,614,797 | B1* | 9/2003 | Hippelainen ........... 370/410 |
| 6,894,974 | B1* | 5/2005 | Aweva et al. .......... 370/230.1 |
| 6,922,390 | B1* | 7/2005 | Chapman et al. ....... 370/229 |
| 7,079,538 | B2* | 7/2006 | Gazsi et al. .......... 370/392 |
| 2002/0196785 | A1* | 12/2002 | Connor ............. 370/392 |
| 2003/0110281 | A1* | 6/2003 | Minnick et al. ....... 709/232 |
| 2003/0236837 | A1* | 12/2003 | Johnson et al. ....... 709/205 |

* cited by examiner

*Primary Examiner*—Chi Pham
*Assistant Examiner*—Shick Hom
(74) *Attorney, Agent, or Firm*—McDonnell Boehnen Hulbert & Berghoff LLP

(57) ABSTRACT

In a Quality of Service system, segments in a TCP session are assigned a priority level. A segment may contain an acknowledgement and data. The system determines if network congestion is detected or anticipated in the segment's priority band or in a higher priority band. When the TCP segment arrives at a network point, the segment is split into an acknowledgement segment and a data segment. The acknowledgement segment is scheduled at a higher QoS priority than the data segment.

16 Claims, 3 Drawing Sheets

METHOD FOR SPLITTING DATA AND ACKNOWLEDGEMENTS IN A TCP SESSION

RELATED CASE

This application claims priority to U.S. Provisional Patent Application Ser. No. 60/354,662, "METHOD FOR SPLITTING DATA AND ACKNOWLEDGEMENTS IN A TCP SESSION," filed on Feb. 5, 2002.

BACKGROUND

1. Field of the Invention

The present invention relates generally to a method for communications using the Transmission Control Protocol ("TCP"), and more specifically, it relates to a method for splitting data and acknowledgements in a TCP session.

2. Description of Related Art

The Transmission Control Protocol (TCP) is a communications protocol that is used in communicating data over a network, such as the Internet. It is a connection-oriented protocol in the transport layer. Used in conjunction with other protocols, such as the Internet Protocol (IP), TCP provides a format for breaking a data message into segments, transmitting the segments over the network, and reassembling the segments to form the original data message.

When a connection is established between two devices, they exchange data by sending segments. Data to be sent is split into fragments, which are then formed into the segments according to specific transmission protocols. The segments are transmitted using TCP/IP and other protocols. The segments may travel over many different links and through routers or other elements before reaching their destination. Since segments may take different paths, they may arrive at the receiver out of order. It is also possible that segments are lost during transmission. TCP provides methods for reassembling segments that arrive out of order and for retransmitting segments that are lost during transmission.

If segments are lost, then the data message cannot be properly reassembled at the receiver, because the receiver will not have all the data. TCP compensates for possible segment loss by having the receiver acknowledge each segment. If an acknowledgement is not received in a specified time after transmission, the transmitter assumes that the segment has been lost and resends the segment.

Each segment sent by the transmitter has a unique identifier. The identifier allows the transmitter and receiver to individually identify each segment. Typically the transmitter sends a certain amount of data and waits for an acknowledgement before sending more data. The receiver acknowledges the segments by sending the transmitter a TCP segment with an acknowledgement bit set and the number of the next segment it expects to receive. By specifying the next segment it expects to receive, the receiver implicitly acknowledges the successful receipt of all previous segments. This format allows the receiver to acknowledge several segments with one acknowledgement; however, the process prevents a receiver from acknowledging a successfully received segment unless all the segments before it were also successfully received. The receiver may piggyback the acknowledgement onto a data segment sent from the receiver to the transmitter.

The data speeds along links between the transmitter and receiver may not be balanced. Data may travel faster in one direction than in the other direction. This may be due to the bandwidth on different segments, the amount of network traffic, router settings or other factors. Typically, when a transmitter sends data it sends a specified amount and waits for an acknowledgement before sending more. The amount of data that can be sent and unacknowledged is set by the system, and it may vary during operation.

A transmitter sends the maximum amount of data allowed by the transmit window. It then stops transmitting and waits for an acknowledgement specifying a new transmit window. If the data path from the transmitter to receiver is fast, all the data may have successfully reached the receiver and the system could support more data; however, since the acknowledgement is slow reaching the transmitter, it unnecessarily sits idle resulting in a delay. The delay may eventually allow the transmitter's timer to expire, which causes the transmitter to unnecessarily resend the segments. These undesirable effects slow the overall data transmission rate.

A similar problem can also occur in Quality of Service (QoS) systems. In a QoS system several sessions may simultaneously occur. Each session is assigned a priority, and sessions with a higher priority receive a greater allocation of system resources. Messages with a higher priority may also get a transmission preference in routers and other components. The higher bandwidth of these messages is at the expense of lower priority messages, which may be delayed. In sessions with lower priority, the acknowledgements may be delayed because higher-priority messages are using the available system resources. The delay may be significantly greater along the acknowledgement path than the data path. The data path may be available for transmission, but due to the delayed acknowledgement the transmitter remains unnecessarily idle.

Some systems attempt to solve this problem by lowering the maximum transmission unit (MTU) of the link. The MTU is the largest physical segment size the network can transmit. Lowering this value may reduce the maximum time required to receive a segment, thereby minimizing the delay in receiving a piggyback acknowledgement. This solution, however, requires user or administrator configuration to change the MTU value, and it introduces significant overhead. By lowering the maximum size of a segment, more segments are required to transmit the same amount of data. The network will take longer to process the additional segments, and the headers of the additional segments means that more total bits have to be sent over the network to support the same amount of data. Additionally, reducing the MTU doesn't prevent TCP window closure when higher priority traffic precludes sending low-priority data.

Therefore, there exists a need to provide a better way to improve the quality of service of a TCP session when reverse direction congestion delays piggybacked acknowledgements and prevents data transmission.

SUMMARY

A data communications network supports quality of service. Sessions are assigned a priority, and the session's priority determines its preference for the use of network resources. Since segments in a session may travel on different paths between two devices, their travel times may differ. Network congestion, available bandwidth and sessions using higher priority bands may cause the session's forward path to be significantly faster than its reverse path.

In a TCP session, data segments are sent from a transmitter to a receiver. The receiver acknowledges the data segments. If the data segments are not acknowledged, the transmitter resends the segments after a period of time. Also, the transmitter is subject to a restraint on the maximum amount of data it can have sent but unacknowledged. When the forward path is fast, the receiver can quickly obtain and process the transmitted data. If the subsequent acknowledgements are delayed, then the transmitter sits idle while waiting for the acknowledgements before being allowed to transmit more data. This causes the transmitter to unnecessarily sit idle, and it causes a drop in the session's overall data speed.

A network device, such as a router, determines the network's current or anticipated congestion. The network device receives a segment sent between two devices. The segment contains both data and an acknowledgement. Based on the network congestion, the device determines whether to separate the segment into two portions. If the network is congested in the segments priority band, or in higher priority bands, the network device splits the segment into a data portion and an acknowledgement portion. The data portion is generally assigned the same priority as the original segment.

The acknowledgement portion is typically assigned a higher priority, which allows it to propagate through the network more quickly. By speeding the receipt of the acknowledgement, the time the transmitter unnecessarily sits idle while waiting for the acknowledgement is reduced. This increases the overall data speed of the session.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

Figure 1:
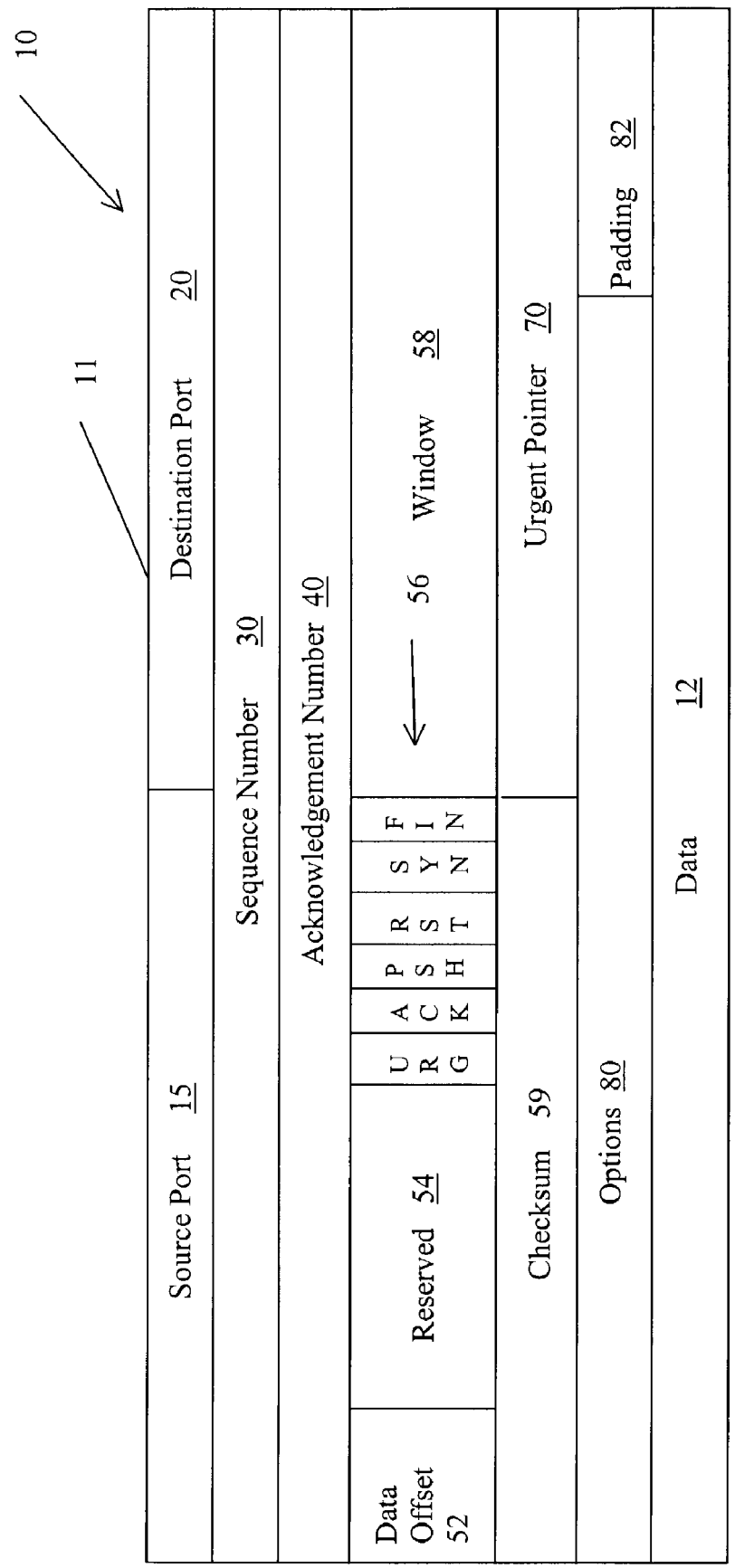
FIG. 1 is an illustration of a TCP segment.

Data may be transmitted between devices over a network. For instance, computers commonly send data over the Internet. Many different standards are used to send and receive data, and more than one standard may be used in a communications session. Standards specify low-level details, like signaling methods, and they specify high-level implementations, like user interaction with application programs.

The International Standards Organization (ISO) has defined a layered architecture for the operation of data communications systems. The ISO Open Systems Interconnect (OSI) model describes a layered system. Each layer provides additional features from the layer below it, and it masks the implementation details of the lower layer. Masking the implementation details allows a communications system to be constructed from independently developed layers.

The ISO OSI model has seven layers. They are: 1) the physical layer, 2) the data link layer, 3) the network layer, 4) the transport layer), 5) the session layer, 6) the presentation layer, and 7) the application layer. The user interfaces with the system at the application layer, which runs programs. The presentation layer typically handles compression, encryption and other features. The session layer handles connections to time-shared services, and it handles login and password authentication.

The physical layer dictates the electrical/optical, mechanical and functional requirements for transmitting the bits on the physical medium. The data link layer runs on top of the physical layer. This layer groups bits into frames. The frames have a definite structure and may be grouped into fields, which have specific functions. The network layer defines structures for routing data from one network to another network.

The Internet Protocol (IP) is a popular network layer protocol. The transport layer establishes reliable end-to-end communication. It divides data into segments for transmission and reassembles the segments to form the original message. This layer handles reassembly of segments that arrive out of order, and it requests retransmission of corrupted or lost segments. The ISO OSI model is a general, exemplary division of services in a data communications system, and each layer may handle additional, fewer or different services than previously described. In addition, layers may be merged in operation so that a distinct division of seven layers is not present.

TCP is a transport layer protocol. TCP commonly operates with IP, which is a network layer protocol. Two of IP's primary functions are to connect multiple networks and to efficiently deliver data between devices. IP, however, does not provide a mechanism to assure that segments will be received at their intended destination. They may be lost due to data corruption, buffer overflow, equipment failure or other problems. TCP complements IP by ensuring reliable end-to-end communication. Among other functions, TCP handles lost or corrupted segments, and it reassembles segments that arrive at their destination out of order.

TCP Segment Description

FIG. 1 is a block diagram illustrating the informational content of a TCP segment 10. A TCP segment is divided into a header 11 and data portions 12. The header portion 11 contains addressing information, and it contains fields used to establish a connection, account for lost segments and provide other services. The data portion 12 of the TCP segment 10 contains a byte stream to be sent from one device to another device. The byte stream in the TCP data portion 12 is simply a sequence of bits; the TCP data portions 12 are not necessarily formed by breaking the original data stream at message boundaries.

The TCP segment 10 contains the following fields: source port 15, destination port 20, sequence number 30, acknowledgement number 40, TCP header length 52, reserved field 54, control bits 56, window size 58, checksum, urgent pointer 70, options 80 and data portion 12. The header portion 11 comprises all of these fields except the data portion 12. The following is a description the segment's fields, as illustrated in FIG. 1, and their functions.

Source Port 15: 16 bits. The source port identifies one end of the TCP connection. IP routes the segments between two IP addresses; however, two IP addresses may support multiple, simultaneous TCP sessions. The source port number differentiates TCP sessions between the same devices, thereby identifying a segment as a part of a particular session. The combination of IP addresses and ports defines a socket.

Destination Port 20: 16 bits. The destination port identifies the other end of the TCP connection. It allows two-way communication between the two devices when multiple TCP sessions are active.

Sequence Number 30: 32 bits. The sequence number field contains the first data byte's sequence number in the overall connection byte stream. Sequence numbers in contiguous TCP segments are generally not numbered sequentially, because the sequence number refers to a byte count and not a segment count.

Acknowledgement Number 40: 32 bits. If the ACK control bit is set, this field contains the value of the next sequence number the sender of the segment expects to receive. Once a connection is established, this bit is generally always set. The acknowledgement number also alerts the recipient that all segments up to the acknowledgement number have been successfully received, and the recipient doesn't need to save its local copies of the acknowledged segments.

TCP Header Length 52: 4 bits. This field specifies the number of 32 bit words in the TCP header 11. It also indicates where the data begins. The TCP header 11, regardless of whether it includes options, is an integral number of 32 bits long.

Reserved 54: 6 bits. When originally designed, the TCP standard reserved this field for future use. It has not, however, be utilized. Its digits must be set to zero.

Control Bits 56: 6 bits (from left to right). TCP defines several control bits that serve various functions.

URG 56a: This bit is set to one if the urgent pointer is used. The function of the urgent pointer will be described later. When set to zero, this bit indicates that the urgent pointer value is not valid.

ACK 56b: When set to one, this bit indicates the acknowledgement number is valid. A value of zero indicates that the acknowledgement field is not valid and its value should be ignored.

PSH 56c: By setting this bit to one, the transmitter requests that all available data is sent. This generally requests a flush of all buffers, instead of allowing the buffers to fill before transmission.

RST 56d: This bit is used to reset the TCP connection.

SYN 56e: This bit is used in establishing a TCP connection and initializing the sequence numbers.

FIN 56f: This bit is used to release a connection, and it may signify that the sender has no more data to transmit.

Window 58: 16 bits. The Window indicates the number of data octets beginning with the one indicated in the acknowledgment field that the sender of this segment is willing to accept. This field prevents a transmitter from continuously sending data without regard to whether acknowledgements are being returned by the receiver.

Checksum 60: 16 bits. This field is the 16 bit one's complement of the one's complement sum of all 16-bit words in the header and text. If a checksum segment contains an odd number of header and text octets, the last octet is padded on the right with zeros to form a 16-bit word. The pad is created for determining the checksum, and it is not transmitted as part of the segment. While computing the checksum, the checksum field itself is replaced with zeros.

The checksum 60 also covers a pseudo-header that is conceptually prefixed to the TCP header 1. This pseudo header is 96 bits long, and it contains the 32-bit source and destination IP addresses, the protocol number for TCP and segment length. The segment length is the TCP header length plus the data length in octets. It does not count the 12 octets of the pseudo header. Including the IP addresses in the pseudo-header helps give protection against misrouted segments; however, it violates the ISO OSI model's layer independence by using the network layer IP addresses in the higher transport layer TCP protocol.

Urgent Pointer 70: 16 bits. The urgent pointer indicates urgent data as a positive offset from the sequence number. The urgent pointer points to the sequence number of the octet following the urgent data. This field only contains valid information when the URG control bit set.

Options 80: variable length. The options field may be used to add extra functionality that was not covered by the header. For instance, it may be used to allow each host to specify the maximum TCP payload it is willing to accept. Options may occupy space at the end of the TCP header and are multiples of 8 bits long. An option may begin on any octet boundary. All options are included in the checksum.

Padding: variable length. The TCP header padding is used to ensure that the TCP header ends and that the data begins on a 32-bit boundary. The padding is composed of zeros.

Data 12: variable length. The data can be a variable length, but it's subject to a maximum allowable value. Since TCP runs above IP, or some other protocol, a complete TCP segment is packaged as the data portion of another transmission protocol segment. The maximum segment size supported by IP is 65,535 bytes. The IP header is 20 bytes. The TCP header is at least 20 bytes, and it may be larger if options are used. Therefore, the maximum amount of data in a TCP segment is 65,495 bytes (65,535−20−20=65,495).

TCP Session Operation

During a TCP session, a connection is established between two devices. TCP supports full duplex communication. The data from one device to the other is split and placed into TCP segments for transmission. The receiver receives the segments, extracts the data and reassembles the data from multiple segments to form the original data stream.

Each TCP segment has a unique number that identifies it. The data segments are reassembled based on the TCP sequence number. Since the data segments may arrive at the receiver out of order or fragmented, the sequence numbers ensure that data is reassembled in its original order.

The transmitter generally sends many segments to the receiver during a session. These segments may reach the receiver, or they may be lost in the network. If the receiver doesn't get all of the segments, then it won't have all of the data needed to reconstruct the original data stream. After sending a segment, the receiver keeps a copy of the segment. The copy is stored in case the original segment is lost and needs to be retransmitted. When a segment is successfully received, the receiver sends an acknowledgement back to the transmitter. The acknowledgement signifies the segment was successfully received and that the transmitter can discard the saved copy.

While it is possible to send one segment, wait for an acknowledgement and send another segment, the transmitter typically sends several segments before stopping to wait for an acknowledgement. TCP systems commonly use a sliding window as a method of flow control for data communications. The sliding window places a limit on the amount of data than can be sent and unacknowledged. Data from the transmitter is received and stored by the receiver, for instance in a buffer. The receiver then reads the data from the buffer. The transmit window is the size of the buffer less the amount of valid data stored in it. The receiver notifies the sender of the current window size. This is typically done by setting the window size field in the acknowledgement segment to the amount of data the receiver is willing to accept. If the receiver doesn't process the data fast enough, the window size eventually drops to zero because the buffer fills. This causes the transmitter to stop sending. When the receiver processes the data, the window size rises and the transmitter starts sending data again.

When the window size is larger than the segment size, multiple segments can be outstanding in the network. The transmitter receives an acknowledgement indicating a window size. It then sends a number of segments up to the window size. Then the transmitter waits for an acknowledgement segment to determine the new window size. Ideally, a steady-state connection can be reached where a series of segments (in the transmit direction) and window announcements (in the return direction) are constantly in transit. As the transmitter receives each new window segment value, more segments are transmitted; and, when the application reads data from the buffer, more window announcements are generated. The series of data and window size acknowledgements helps to ensure the efficient use of network resources.

The receiver acknowledges a segment by sending the transmitter an acknowledgment segment. In the acknowledgment segment, the ACK control bit is set and the acknowledgement number field contains the number of the next segment the receiver expects to receive. The acknowledgement number indicates that all segments up to the acknowledged number have been successfully received.

For example, the transmitter sends the receiver segments 1, 2 and 3. The receiver receives segments 1 and 3, but not 2. Next, the receiver sends an acknowledgement indicating it received segment 1. The receiver cannot acknowledge segment 3, because sending an acknowledging segment 3 would also indicate that segments 1 and 2 were successfully received. The transmitter responds to the acknowledgement by sending segment 4, which is received. The receiver responds with the same acknowledgement of segment 1, because segment 2 still has not been received. Next, the transmitter sends segment 5, which is received along with segment 2. Now the receiver sends an acknowledgement indicating it next expects to receive segment 6. The acknowledgement indicates that it successfully received segments 1, 2, 3, 4 and 5.

For each segment it transmits, the transmitter also starts a clock. If the segment is not acknowledged before the clock expires, the transmitter resends the segment. The retransmission occurs regardless of whether the segment may actually have been received. In another example, the transmitter sends segments 1, 2, 3, 4 and 5 to the receiver; it stores a copy of each segment; and, it starts a timer for each segment. The receiver receives segments 1, 3, 4 and 5, but segment 2 is lost during transmission. The receiver sends an acknowledgement indicating it received segment 1, but since it didn't receive segment 2 it is unable to acknowledge receipt of segments 3, 4 and 5. Since segment 1 was acknowledged, the transmitter may stop its timer and discard its copy. The transmitter now sends segment 6, and it starts a new timer for segment 6, which is successfully received. The receiver sends an acknowledgement, which again only indicates it received segment 1. If the timers for segments 2-5 now expire, the transmitter will retransmit all four segments.

Retransmitting segments 2, 3, 4 and 5 is inefficient, because segments 3, 4 and 5 were successfully received. Some systems compensate for this inefficiency by allowing the receiver to send a negative acknowledgement. The negative acknowledgement indicates that the receiver has not received a segment and that the transmitter should resend only that segment. The negative acknowledgement is useful, because it allows a single segment to be retransmitted. The single unreceived segment may be preventing the acknowledgement of several other segments. By receiving the segment and acknowledging the other segments before their timers expire, the system can prevent retransmitting the received but unacknowledged segments. In the previous example, if the receiver sent a negative acknowledgement requesting the transmitter to resend segment 2 before its timer expired, then it may be possible to prevent the unnecessary retransmission of segments 3, 4 and 5.

Segments sent between devices during a TCP session generally do not go straight from one device to another. Typically the segments pass through other elements as they travel through the network. The elements may be hubs, routers, computers or other devices. The elements generally direct the segment to the correct location, but they may perform other functions such as fragmenting a segment or altering certain fields in the segment. The TCP connection between devices does not specify a path to be used by all segments. For segments traveling between the devices, each segment can potentially take a different path. The paths may change due to available bandwidth, link speeds, network traffic, devices coming on or off line, or other factors.

Each path between the devices may contain different elements. The bandwidth along path links and the traffic along path links may vary. These factors may cause the speeds along different paths to vary. Other factors may also cause the path speeds to vary. Since the data speed along each path may differ, different segments may take differing amounts of time to reach their destinations. The speeds on the return paths may also vary, and this may cause the transmit path between two devices to be significantly faster than the return path between the same two devices. Therefore, the average speed in one direction may significantly vary from the average speed in the other direction.

In a segment-oriented bi-directional data flow between two entities, such as a web server and a dialup client PC, the segment flow typically passes through a router. In the case of remote access equipment, the bi-directional segment flow typically passes through a dialup Network Access Server (NAS) before being transmitted to the client PC. Segments may be queued up in the NAS in each direction for transmit. Due to bandwidth constraints, it is more likely for segments to be queued up as they head towards the client PC rather than away from it. This queuing of the data may cause a difference in data speeds on the transmit and return paths between two devices. The difference may delay acknowledgements and cause retransmission of successfully received segments.

If the transmit path is sufficiently fast, the transmitter may send large amounts of data. The transmitter will quickly reach a maximum amount of data that can be sent and unacknowledged. It then waits for an acknowledgement; however, due to the slow return path the acknowledgement is delayed. During this time the data was successfully received, and the transmitter could send more data on the fast transmit path without overrunning the receiver's buffer. But, because the acknowledgement is slow in returning, both the transmitter and receiver sit idle. This delay in receiving the acknowledgement unnecessarily slows down the system. If a sufficient delay occurs in one direction, protocols, such as TCP, that utilize a sliding window may either stop transmitting altogether or dramatically slow their data transmission. This problem may be particularly acute in quality of service (QoS) systems.

In a generic system, the TCP segments 10 may be sent over a network. An intermediate device, such as a router, may receive the segments 10 and processes them. In one common method, first in first out (FIFO), the intermediate device may process the segments 10 in a sequential order. An earlier segment that arrives earlier in time is processed through the intermediate device before later segments arriving later in time. Other methods, such as last in first out (LIFO), may also be used to process the segments 10. The commonality between these methods is that the segments 10 are processed, based at least in part, on the times in which they arrive. The segments are generally not otherwise distinguished.

Figure 2:
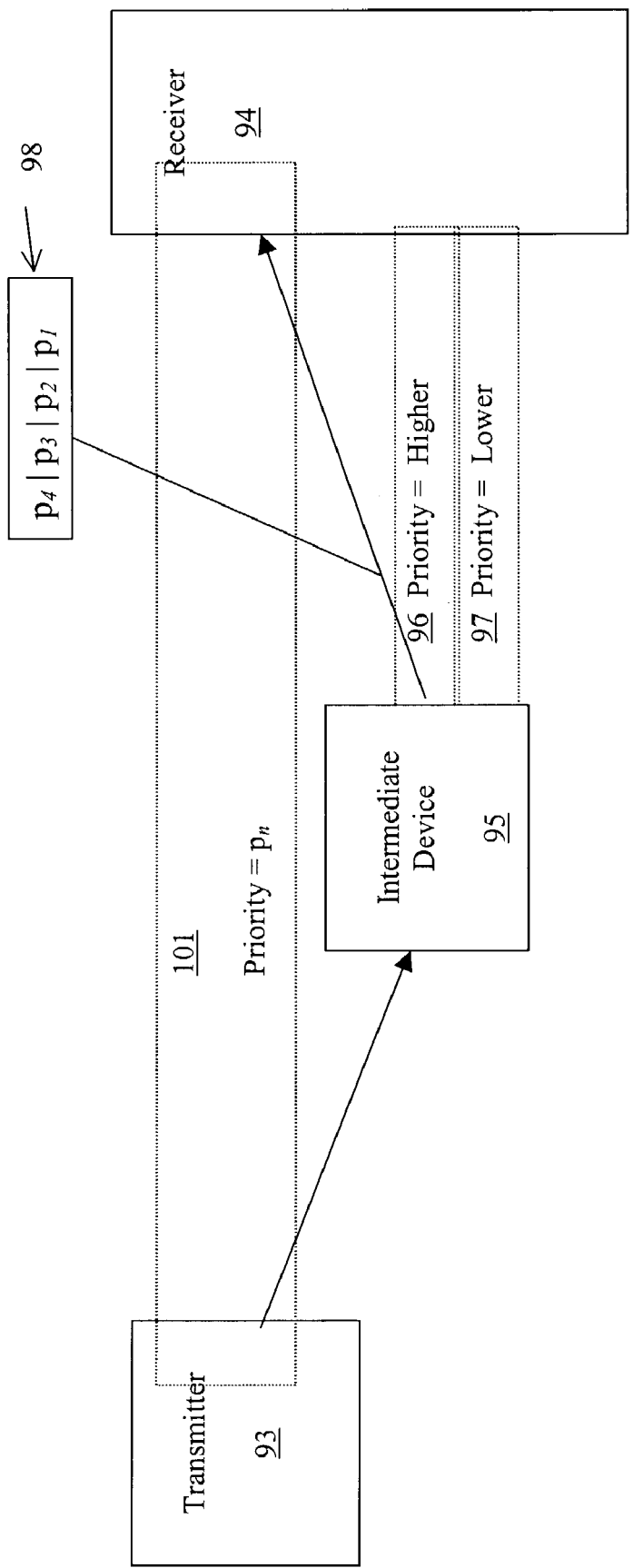
FIG. 2 is a block diagram of a system in which exemplary embodiments may be advantageously used.

In a quality of service (QoS) system 91, an example of which is shown in FIG. 2, sessions 101 between devices in a network 92 comprising a transmitter 93 and a receiver 94 may be assigned a priority $p_n$. The priority provides a preference for the use of network resources. For instance, an intermediate device 95 may transmit segments for a session with a higher priority 96 before those of a lower priority 97, regardless of the time that the segment arrived at the intermediate device 95. The QoS system may support multiple priority levels, and segments within a particular session may be assigned a different priority.

In advanced intermediate devices such as routers that support QoS, segments are typically placed into the queue not in absolute FIFO order, but rather in FIFO order within priority bands 98 (e.g. $p_1$, $p_2$, $p_3$, $p_4$) as defined by the priority policy being enforced by the router. This allows segments with a higher priority (e.g. $p_1$) to be given preference in transmission. Generally, a segment with a higher priority will move throughout the network at a greater speed, and it will generally move at the expense of a segment with a lower priority. Segments with lower priority generally move more slowly throughout the network, because their transmission is delayed while segments with higher priority are processed.

In the QoS system in FIG. 2, a TCP segment 10 may contain both data and control information. The control information, for example, may be an acknowledgment of received data. The QoS is typically enforced on the entire segment. Enforcing the quality of service on the entire segment may delay the segment while other higher priority messages are transmitted on the system. This delays both the data and the control information. A delay in acknowledging received segments may cause the received segments to be needlessly retransmitted. It may also keep the transmitter idle when the network and the receiver could easily support more data. These problems may be particularly acute in a QoS system where the return path is slower than the transmit path.

Figure 3:
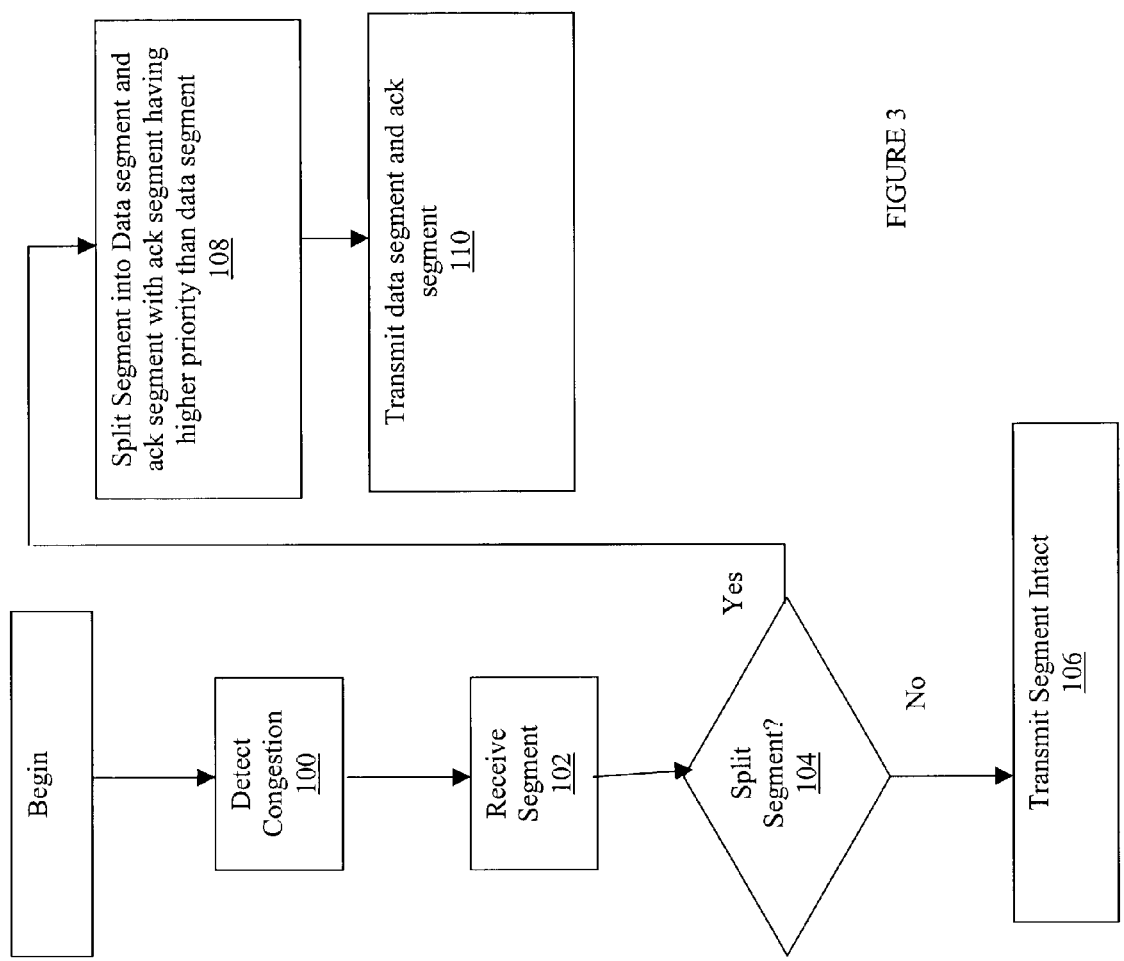
FIG. 3 is a flowchart of a process for splitting TCP segments.

In order to speed receipt of the acknowledgement, the control information in a TCP segment may be separated from the data. Once the segment has been split, the effect of congestion in the ACK path can be reduced or eliminated. FIG. 3 shows a flowchart of a process for splitting a TCP segment. At Step 100, the congestion of the network is determined. A network device, such as a router, may determine if congestion is detected or anticipated in the network's priority bands, or another device may make this determination and send the results to the network device. Next, the network device receives a segment 102. The network device then determines whether to split the segment 104. When congestion is detected or anticipated in the segment's priority band or in a higher priority band, the control and data information of the segment may be split. If congestion is not detected or not anticipated, the segment may be left intact and transmitted through the network 106. After detecting congestion and deciding to split the segment, the network device separates the received segment into a data segment and an acknowledgement segment 108. The acknowledgement segment is generally assigned a higher priority than the data segment, which allows it to propagate more quickly through the network. After the two segments are formed, the network device transmits them 110.

The system may determine or anticipate network congestion in a variety of different ways. In one method, a network device sends segments between itself and another device and measures the travel times. The travel times of the segments are then averaged to determine an estimated travel time. The same procedure can be used on the return path to determine its average travel time. This procedure may be performed once when the connection is established, or it may be performed periodically to account for changing conditions.

In another method, the system uses historical information to determine the congestion along certain paths. The historical information may come from external sources, such as performance measurements obtained or entered by a user. Additional information may be obtained by measuring the travel times of segments over a period of time. These measurements may then be used to develop a historical model of segments' travel times. The measurements may track origin of the segments, time, number of other devices connected to the network or other factors.

Alternatively, a router or other network device may examine the window size of a TCP packet. The window size is a measure of how much data a receiver is willing to accept. Often that amount is based, at least in part, on the network's congestion. Examining the window size may provide an estimation of the system's congestion.

TCP applications often use intricate algorithms to determine the timeout values for TCP segments. The timeout value determines a balance between achieving a high data rate by rapidly retransmitting lost segments and preventing the unnecessary retransmission of lost segments. A low timeout value means that segments that aren't quickly acknowledged will be rapidly retransmitted in order to achieve a faster overall transmission rate. A low value, while providing a fast transmission rate, will needlessly retransmit many packets that were received but unacknowledged before the timer expired. The problem is magnified in a congested network where acknowledgements may be delayed in reaching the transmitter. Using a larger timeout value means that the number of needlessly retransmitted packets will be reduced, but the system will sit idle for longer periods while waiting for acknowledgements. Where segments are lost, the transmitter sits idle for a longer time before timing out and retransmitting the segments. This can lead to a lower overall transmission speed. One of the major factors in setting the timeout value is the network's congestion. A large optimal timeout value may mean the network is highly congested, because the acknowledgements take a long time to travel over the network and return to the transmitter. A low optimal timeout value may mean that acknowledgements are expected to quickly return, and this indicates the network is not congested.

The actual or estimated network congestion may be determined by various components throughout the network. For instance, a computer on the network may make a determination of the network's congestion. Using that determination, the computer may decide to separate acknowledgements and data in TCP segments before sending them. The computer may also send the determination to other computers, which can then use the information to separate data and acknowledgements. Routers may also receive the information from the computer, and based on the information the routers decide whether to split TCP segments. Alternatively, the routers independently determine the network's congestion. The routers may send the information to another router or device, or they may transmit it to other computers on the network. Based on this information the router makes the determination whether to separate the piggybacked acknowledgements.

Routers may also be equipped to determine path speeds between devices or to estimate network congestion, and typically this is performed as a part of a routing algorithm. In an adaptive routing algorithm the router may make its routing decisions based on network topology and traffic. The adaptive algorithm may specify where the router gets it information, how often the router changes the routes and how the optimal path is determined. Other implementation details may also be provided. It is possible to use this information to determine whether to split a piggybacked acknowledgement.

One or more methods may be used to determine network congestion. The results may be combined to provide a further estimation, or they may be used independently by different devices. Multiple network devices may make their own determinations of network congestion, and they may use different methods. In yet another embodiment, the data and acknowledgements are always split, regardless of the network's congestion. In another embodiment, only TCP segments where the data-offset header has a value of 5 (i.e., a simple TCP header with no options) and the control bits were ACK or ACK/PSH are split.

In yet another embodiment, network devices may continually make determinations as to the network's congestion, which are then applied to a segment. For instance, a computer may make a first determination as to the network's congestion. Based on the determination, the computer decides to combine the acknowledgement with data and to assign the packet a priority. The packet is transmitted over the network, and it arrives at a router. The router makes its own determination, using a different method than the computer, and it also decides the segment should not be split. The segment then travels to another router. That router decides the network is sufficiently congested, and it fragments the TCP segment into an acknowledgement segment and a data segment. The router assigns the acknowledgement segment a higher priority than it was originally assigned. The acknowledgement segment then travels to another router. Here, the router cannot split the segment, because it was already separated into a data and acknowledgement segments; however, based on the anticipated network congestion, the router assigns the acknowledgement segment an even higher priority than it was assigned when it was split from the data portion. This illustrates one example operation. Many other variations are also possible.

When a TCP segment arrives at a network point, such as a router, the segment is split into an ACK segment and a data segment. The ACK segment can be scheduled at a higher QoS priority than the data segment. Scheduling the ACK segment at a higher QoS priority generally increases the speed with which it arrives at its destination. The priority assigned to the acknowledgement segment may be based on the network's congestion, with the segment assigned higher priorities as the congestion of the network increases. Typically, segments are split during an established TCP session; however, it is possible to split segments when the session is in other states.

The router or other device splitting the segment typically handles creating the new segments. The acknowledgement segment may be created by duplicating the existing frame. The data is deleted from the frame. Deleting the data generally requires that the length of the segment at the TCP and IP layers be adjusted. The checksums at the IP and TCP layers may also have to be recomputed.

The data segment may be created by using the original segment or creating a copy of the original segment. The ACK flag in the TCP header is turned off. The TCP checksum is recomputed, and other checksums may also have to be recomputed. For instance, the checksum of the IP segment carrying the TCP segment may have to be recomputed.

While this implementation describes a TCP segment, other data protocols may also be used. The method for splitting a segment and creating separate data and acknowledgement segments will vary with the protocol used. Fewer or additional fields may have to be modified.

Quality of service may be implemented in a variety of different ways. While TCP does not directly support QoS, it may be coupled with a protocol, such as IPv6 or IPv4, that does support QoS. An IPv6 frame contains two fields that may be used to support quality of service. The 4-bit priority frame in the IPv6 header generally indicates a segment's priority. A higher number indicates a higher priority, and segments with a higher priority may be given transmission preference over lower priority segments. The flow label field may also indicate priority. For instance, the flow labels may be defined in advance. Routers may be programmed to associate particular flow labels with differing priorities, or they may have access to lookup tables to determine the meaning of different flow labels.

When used with IPv6, the TCP segments are transmitted as the data portions of IPv6 segments. When the router, or other device, splits a TCP segment into data and acknowledgement portions, it is necessary to set the priority of the segment. The priority may be changed by altering the priority field or flow label field in the IPv6 segment carrying the TCP segment. In one embodiment, the router assigns the acknowledgement a priority higher than the congested portions of the network. Other assignments are also possible. For instance, the router may assign the acknowledgement segment a priority a fixed number of levels higher than the priority of the original segment, or the system may set a maximum priority level for the acknowledgement segments.

Since a system may implement quality of service in a myriad of different ways, the method of altering the priority of a segment may change with the particular quality of service implementation. Additionally, while the method of splitting data and acknowledgements has been described for a TCP system, it may be implemented in other systems that acknowledge the receipt of data or other information.

An exemplary embodiment of the present invention has been described above. Those skilled in the art will understand, however, that changes and modifications may be made to this embodiment without departing from the true scope and spirit of the present invention, which is defined by the claims.

We claim:

1. A method for communicating Transmission Control Protocol (TCP) data segments in a communications session comprising a receiver, a transmitter and an intermediate device, comprising the steps of:
   transmitting a first segment from the transmitter, wherein the first segment contains a data portion and an acknowledgement portion;
   receiving the first segment at the intermediate device;
   determining a congestion level of a network at the intermediate device and responsively splitting the first segment into a data segment and a control segment based on the congestion level, wherein the data segment contains the data portion of the first segment, and wherein the control segment contains a control portion of the first segment;

responsive to splitting the first segment, assigning a priority level to the control segment and assigning a priority level to the data segment different from the priority level assigned to the control segment;

sending the data segment to the receiver; and sending the control segment to the receiver.

2. The method of claim 1, wherein the control segment is assigned an acknowledgement priority level, wherein the data segment is assigned a data priority level, and wherein segments with a higher priority level receive a preference for the use of network resources.

3. The method of claim 2, wherein the acknowledgement priority level is higher than the data priority level.

4. The method of claim 1, wherein the control segment is assigned an acknowledgement priority level, wherein the data segment is assigned a data priority level, wherein the acknowledgement priority level is based on the congestion level, and wherein segments with a higher priority level receive a preference for the use of network resources.

5. The method of claim 1, wherein the communications session uses TCP.

6. The method of claim 1, wherein the communications session uses either IPv4 or IPv6.

7. The method of claim 1, wherein the intermediate device is a router.

8. A method of acknowledging data in a communications network, comprising the steps of:

receiving a segment at a network element, wherein the segment is assigned a first priority level from a plurality of priority levels, and wherein the segment contains a data section and an acknowledgement section;

determining a congestion level of the communication network at an intermediate device and responsively splitting the segment into a data segment and an acknowledgement segment based on the congestion level, wherein the data segment contains the data section, and wherein the acknowledgement segment contains the acknowledgement section;

assigning the data segment a second priority from the plurality of priority levels;

assigning the acknowledgement segment a third priority from the plurality of priority levels, wherein the third priority is a higher priority than the second priority; and transmitting the data segment and the acknowledgement segment.

9. The method of claim 8, wherein the third priority is based on the congestion level of the communications network.

10. The method of claim 8, wherein the communications network uses TCP.

11. The method of claim 8, wherein the first priority is the same as the second priority.

12. The method of claim 1, wherein the determining congestion is performed by the intermediate device.

13. The method of claim 1, wherein the determining congestion is performed by a computer on the network.

14. The method of claim 1, wherein the determining congestion is an estimation of network congestion.

15. The method of claim 1, wherein the determining congestion is based on measured travel times.

16. The method of claim 1, wherein the determining congestion is based on historical information.

* * * * *